United States Patent
Malhan et al.

(10) Patent No.: US 8,909,145 B2
(45) Date of Patent: *Dec. 9, 2014

(54) WIRELESS TELEMETRY AUTO FOR TORQUE MEASUREMENT SYSTEM

(71) Applicant: Honeywell International Inc., Morristown, NJ (US)

(72) Inventors: Vishal Malhan, Bangalore (IN); Gourango Biswas, Bangalore (IN); Narayan Singh Rana, Bangalore (IN); Gautham Ramamurthy, Bangalore (IN); Balaji Mahadev, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/092,626

(22) Filed: Nov. 27, 2013

(65) Prior Publication Data

US 2014/0146897 A1 May 29, 2014

Related U.S. Application Data

(63) Continuation of application No. 13/155,937, filed on Jun. 8, 2011, now Pat. No. 8,626,063.

(51) Int. Cl.
*H04B 5/00* (2006.01)

(52) U.S. Cl.
USPC ............ 455/41.1; 455/67.11; 455/234.2; 455/236.1; 375/238; 375/259; 318/701; 318/565; 310/78; 310/309; 324/660

(58) Field of Classification Search
USPC ........ 455/41.1, 67.11, 234.2, 236.1; 375/238, 375/259; 702/42; 318/701, 565, 727, 254; 310/309, 78; 324/660; 361/296
See application file for complete search history.

(56) References Cited

U.S. PATENT DOCUMENTS

| | | | | |
|---|---|---|---|---|
| 4,434,390 | A * | 2/1984 | Elms | 318/473 |
| 4,461,986 | A * | 7/1984 | Maynard et al. | 318/728 |
| 5,220,259 | A * | 6/1993 | Werner et al. | 318/432 |
| 5,345,827 | A * | 9/1994 | Brassert et al. | 73/862.15 |
| 6,084,368 | A * | 7/2000 | Doemens et al. | 318/493 |
| 6,434,512 | B1 * | 8/2002 | Discenzo | 702/184 |
| 6,456,946 | B1 * | 9/2002 | O'Gorman | 702/58 |
| 6,672,169 | B2 * | 1/2004 | Clymer et al. | 73/660 |
| 7,095,131 | B2 * | 8/2006 | Mikhail et al. | 290/44 |
| 7,239,065 | B2 * | 7/2007 | Horst | 310/309 |
| 7,282,944 | B2 * | 10/2007 | Gunn et al. | 324/764.01 |
| 7,521,836 | B2 * | 4/2009 | Horst | 310/309 |
| 7,656,135 | B2 * | 2/2010 | Schram et al. | 322/59 |
| 8,022,565 | B2 * | 9/2011 | Scholte-Wassink et al. | 290/44 |
| 8,046,109 | B2 * | 10/2011 | Larsen et al. | 700/293 |
| 8,054,033 | B2 * | 11/2011 | Kern et al. | 318/811 |

(Continued)

*Primary Examiner* — Marceau Milord
(74) *Attorney, Agent, or Firm* — Craige Thompson; Thompson Patent Law

(57) ABSTRACT

A torque measurement system that includes a rotor device and a stator device can perform automatic tuning to improve the initial tuning performed during design and assembly. The stator device can include a variable capacitive element and a micro-controller configured to adjust a capacitance value of the variable capacitive element. Additionally or alternatively, the rotor device can include a variable capacitive element and a micro-controller configured to adjust a capacitance value of the variable capacitive element. The adjustment of the capacitive elements can be based on the quality of signal detected at either the rotor device or stator device.

20 Claims, 8 Drawing Sheets

(56) References Cited

U.S. PATENT DOCUMENTS

| | | | |
|---|---|---|---|
| 8,395,360 B2* | 3/2013 | Tripathi et al. | 322/29 |
| 8,471,552 B2* | 6/2013 | Suzuki | 324/207.25 |
| 8,487,572 B2* | 7/2013 | Kern et al. | 318/400.35 |
| 8,626,063 B2* | 1/2014 | Malhan et al. | 455/41.1 |

* cited by examiner

WIRELESS TELEMETRY AUTO FOR TORQUE MEASUREMENT SYSTEM

CROSS-REFERENCE TO RELATED APPLICATIONS

This application claims priority to, and is a continuation of U.S. patent application Ser. No. 13/155,937, entitled "Wireless Telemetry Auto Tuning for Torque Measurement System," filed Jun. 8, 2011 by Vishal Malhan. This application claims priority to the following application, the entire disclosure of which is incorporated herein by reference:
Ser. No. 13/155,937 Wireless Telemetry Auto Tuning for Torque Measurement System Jun. 8, 2001

TECHNICAL FIELD

This disclosure relates generally to torque measurement systems and, more specifically, to techniques for tuning a telemetry system of a torque measurement system.

BACKGROUND

A torque measurement system typically includes a rotor device (rotor) and a stator device (stator). The rotor is generally configured to attach to a rotating system such as an engine turbine, gearbox, transmission, or other piece of rotating equipment. The rotor includes strain gages for sensing torque, rotor electronics (RTE) for performing signal processing operations, and an antenna for inductively receiving power from the stator and for communicating with the stator. The stator is typically stationary and external to the rotating system and includes a coupling module in close proximity to the antenna of the rotor for receiving a signal from the RTE. The coupling module is often times in the shape of a caliper and referred to as a caliper coupling module (CCM). The CCM transfers the signal received from the rotor to stator electronics (STE) that perform signal processing to extract the torque measurements in the signal. The stator may, for example, work in conjunction with a personal computer to process and present the data collected by the RTE. The stator can also transmit instructions to the RTE, provide power to the RTE through inductive coupling, and receive status information transmitted by the RTE.

The rotor and stator each include an inductive antenna for bi-directional communication. Initially, the antennas are manually tuned at the factory where the torque measurement system is assembled. This tuning ensures that the rotor receives an adequate signal from the stator, and vice versa. This initial tuning generally matches the resonant frequency of the RTE and the STE close to the telemetry frequency through the selection of electronic components, such as capacitors. Manufacturing variations in electronic components, ageing of electronic components, as wells as variations in operating conditions, and other variable factors, however, can cause the tuning of the antennas determined during the initial tuning to no longer be accurate once a system is assembled and installed at a customer location. After assembly, however, the rotor antenna and stator antenna are typically not easily tunable.

SUMMARY

This disclosure generally describes a torque measurement system that includes a rotor device and a stator device. The rotor is generally configured to attach to a rotating system such as an engine turbine, gearbox, transmission, or other piece of rotating equipment. The stator is typically stationary and external to the rotating system and includes a coupling module in close proximity to an antenna of the rotor. The rotor and stator each include an inductive antenna for bi-directional communication. According to techniques of this disclosure, an inductive antenna of the rotor, stator, or both can be automatically tuned in a manner that may improve both power transfer and data transfer between the rotor and stator.

In one example, a torque measurement system includes a stator device configured to receive a signal from a rotor device. The stator device includes a first variable capacitive element and a first micro-controller configured to adjust a first capacitance value of the first variable capacitive element. In another example, a torque measurement system includes a rotor device configured to transmit a signal to a stator device, and the rotor device includes a variable capacitive element and a micro-controller configured to adjust a capacitance value of the variable capacitive element.

DETAILED DESCRIPTION

This disclosure generally describes a torque measurement system that includes a rotor device and a stator device. The rotor is generally configured to attach to a rotating system such as an engine turbine, gearbox, transmission, or other piece of rotating equipment. The stator device is typically stationary and external to the rotating system and includes a coupling module in close proximity to an antenna of the rotor. The rotor and stator each include an inductive antenna for bi-directional communication. According to techniques of this disclosure, an inductive antenna of the rotor, stator, or both can be automatically tuned in a manner that may improve both power transfer and data transfer between the rotor and stator.

In this disclosure, "stator tuning" generally refers to adjusting parameters, such as a capacitance value, of stator components to adjust the overall tuning of a torque measurement. Similarly, "rotor tuning" generally refers to adjusting parameters, such as a capacitance value, of rotor components to adjust the overall tuning of a torque measurement system. "System tuning" or "overall tuning," as used in this disclosure can refer to any of stator tuning, rotor tuning, or a combination of both.

Figure 1:
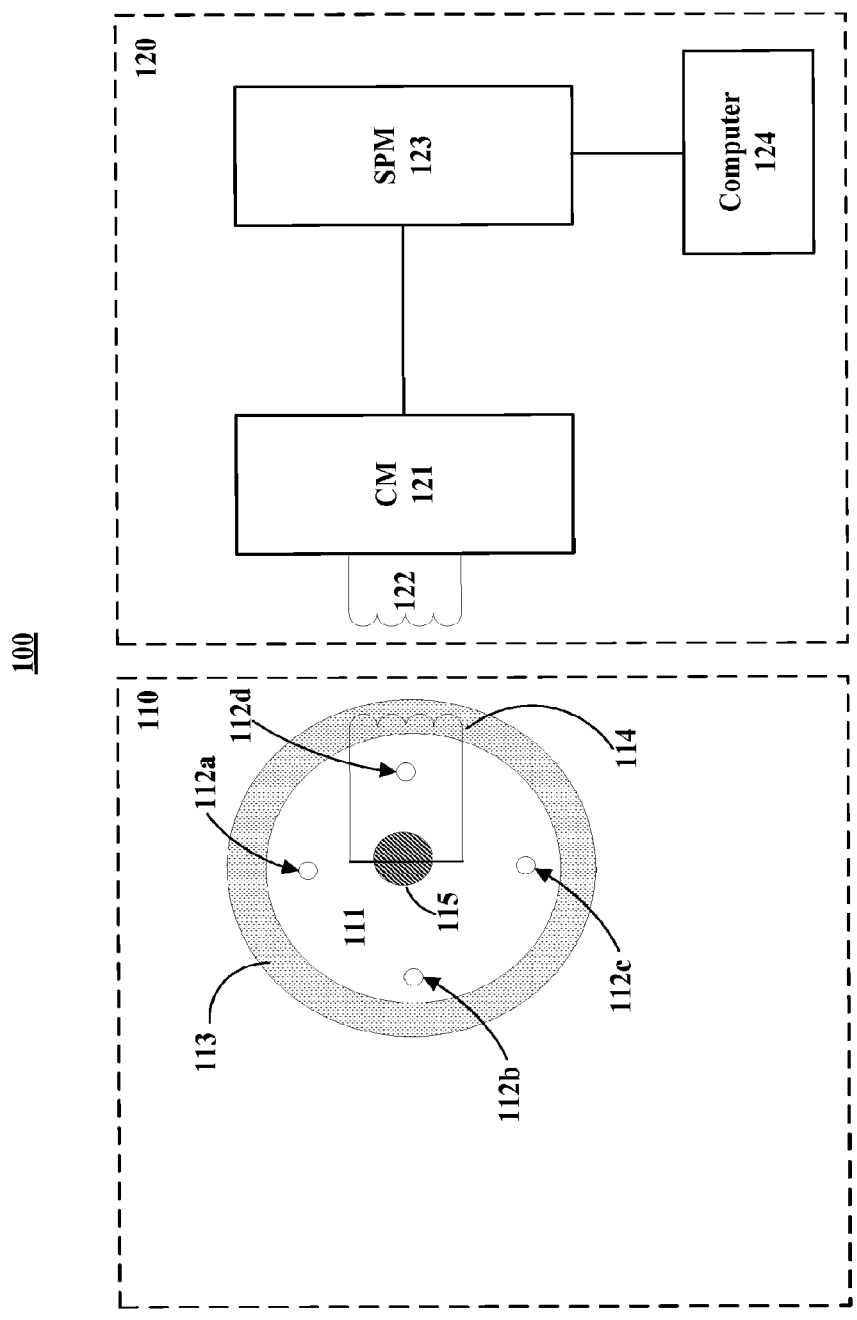
FIG. 1 is a block diagram that illustrates one example of a torque measurement system configured to implement aspects of this disclosure.

FIG. 1 is a block diagram that illustrates one example of a torque measurement system 100 configured to implement aspects of this disclosure. Torque measurement system 100 includes rotor 110 and stator 120. Rotor 110 includes flange 111, holes 112a-112d, ring 113, antenna 114, and circuitry 115. Antenna 114 and circuitry 115 may collectively be referred to as the rotor electronics (RTE). Stator 120 includes coupling module (CM) 121, antenna 122, signal processing module (SPM) 123, and computer 124. Rotor 110 connects to a rotating mechanism such as a turbine of an engine through holes 112a-112d in flange 111. Flange 111 contains a series of strain gages (not shown) for making torque measurements as rotor 110 rotates. The output of the strain gauges, also referred to as torque measurement signals, is transmitted from the strain gauges on flange 111 to circuitry 115. Circuitry 115 may be embedded on a printed circuit board and configured to perform a series of signal processing operations, such as amplification, digitization, and/or amplitude modulation, on the strain gage output prior to transmitting the torque measurement signals to stator 120 via antenna 114, which may be embedded in ring 113.

Antenna 114 may be configured to both transmit and receive a radio frequency (RF) signal to and from antenna 122 of stator 120. The RF signal can be amplitude modulated to include digital data for purposes of communication. In addition to digital communication data, stator 120 also wirelessly supplies power to rotor 110 via electromagnetic induction from antenna 122 to antenna 114. When supplying power but not transmitting data, the RF signal transmitted from stator 120 to 110 may not be amplitude modulated. The transmissions between antenna 114 and antenna 122 occur at a selected carrier frequency, which is often either approximately 6.78 MHz or 13.56 MHz but may also be at other frequencies. The carrier frequency is also sometimes referred to as the telemetry frequency. When torque measurement system 100 is in operation, ring 113 is typically placed less than a few centimeters away from CM 121 and antenna 122. In some implementations CM 121 can be a caliper coupling module in the shape of a caliper that partially surrounds ring 113.

Stator 120 receives the signal with the torque measurement data via antenna 122 from antenna 114 through inductive communication. Antenna 122 and antenna 114 can be inductively coupled coils, hoop antennas, or other appropriately suited types of antennas. Antenna 122 may be included in CM 121 which is located in close proximity to antenna 114 of rotor 110. CM 121 and SPM 123 perform various signal processing operations, such as demodulation and amplification, on the received signal to extract the torque measurement data obtained by rotor 110. CM 121, antenna 122, and SPM 123 may collectively be referred to in this disclosure as stator electronics (STE). Computer 124 can present the torque measurement data to a user of the system of FIG. 1.

The system of FIG. 1 is intended to illustrate the functionality of rotor 110 and stator 120 by showing one example configuration. The various functional units described for FIG. 1, however, may be implemented in numerous other configurations. For example, in some implementations the functionality of SPM 123 and computer 124 may be combined into a common device or unit. As another example, in some implementations antenna 122, CM 121, and SPM 123 may be included in a common device or unit, but in other examples, CM121 and SPM 123 may be separate devices or units communicatively coupled through a wired or wireless channel.

The RTE and STE can initially be tuned when rotor 110 and stator 120 are assembled. As will be described in more detail below, the STE includes a series LC tuned circuit that includes a capacitor (C) in series with an inductor (L). The current in antenna 122 may be at a maximum value or close to a maximum value when the resonant frequency of the series LC circuit is approximately equal to the telemetry frequency, i.e. the carrier frequency. Additionally, as will be described in more detail below, the RTE includes a parallel LC tuned circuit, which includes a capacitor (C) in parallel with an inductor (L). The current in antenna 114 may be at a maximum value or close to maximum value when the resonant frequency of the parallel LC circuit of the RTE is approximately equal to the telemetry frequency. The initial tuning at the time of assembly includes determining a C value for the STE and a C value for the RTE, respectively.

The tuning performed at the time of assembly, however, may no longer be accurate when the system is installed, at a customer location for example. This is often true because the environments in which torque measurement systems are used tend to have a lot of metal in close proximity to antenna 122 and antenna 114, which can alter the optimal tuning Additionally, when initially tuning antenna 122 and antenna 114, it can be difficult to account for manufacturing variations that can occur with various components, as well as the changes that can occur to components as the components age and wear. As will be described in more detail below, in accordance with techniques of this disclosure, one or both of antenna 114 and antenna 122 can be automatically tunable, thus allowing for the initial tuning done at the factory to be refined once the torque measurement system is installed. By tuning antennas 114 and/or 122, the amount of power received by rotor 110 from stator 120 may be increased, and the quality of data communication between rotor 110 and stator 120 may be improved.

As will be described in more detail below, aspects of the present disclosure include the use of one or more microcontrollers in either or both of rotor 110 and stator 120 to perform an automatic tuning procedure. The automatic tuning procedure may, for example, be performed each time the torque measurement system is powered on, periodically, or upon user command. The automatic tuning procedure may include stator tuning, rotor tuning, or both. Rotor 110 and stator 120 might typically be coarsely tuned at the time of assembly, and the automatic tuning procedure described in this disclosure may serve as a fine adjustment to that coarse tuning. As will be described in more detail below, the techniques of this disclosure may implement stator tuning by utilizing a variable capacitive element in the STE that can be controlled by a microcontroller to adjust the C value in the LC circuit of the STE. The techniques of the present disclosure may additionally or alternatively implement rotor tuning by utilizing a variable capacitive element in the RTE that can be controlled by a microcontroller to adjust the C value in the LC circuit of the RTE.

Figure 2A:
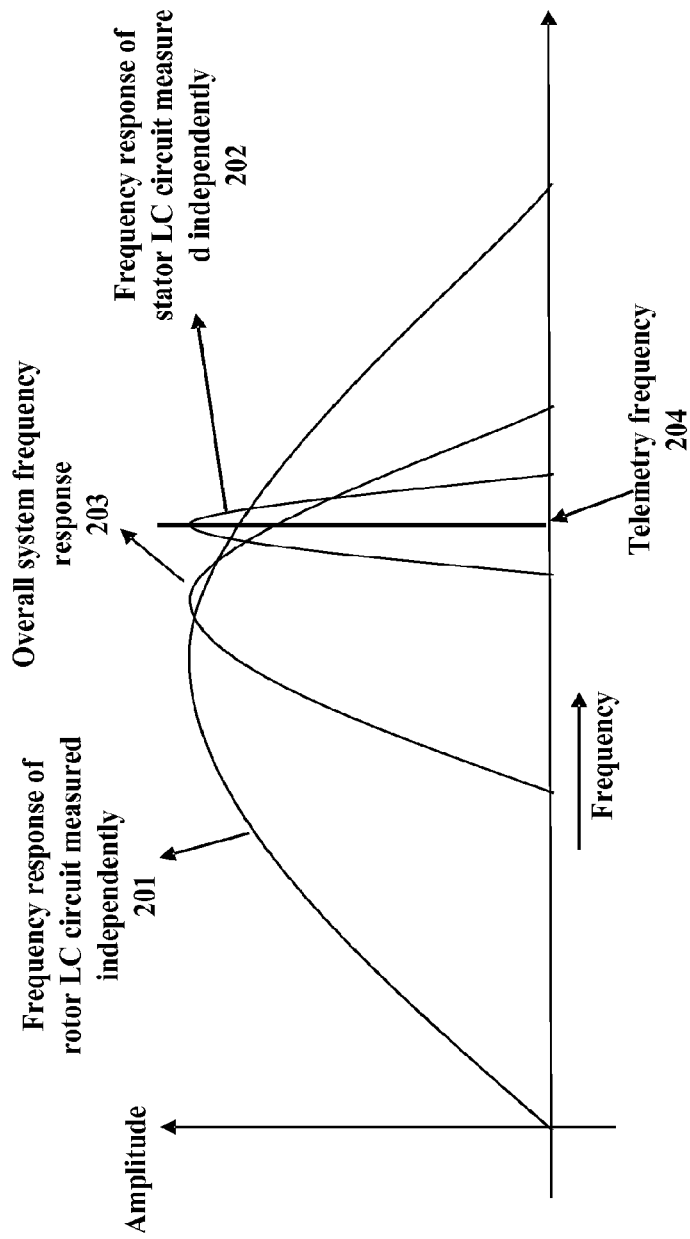
FIGS. 2A-2D are graphs showing the frequency response of various portions of the system described in this disclosure.

FIG. 2a is a graph showing the frequency response of the rotor LC circuit measured independently (curve 201), the stator LC circuit measured independently (curve 202), the frequency response of the overall system (curve 203), and the telemetry frequency (line 204). As can be seen by the narrowness of curve 202 compared to curve 201, that STE has a higher degree of selectivity compared to the RTE. Accordingly, the 3 dB-bandwidth (i.e. the frequency at which output power drops by approximately 50%) is approximately two MHz for the RTE but only a few hundred KHz for the STE, making the overall system 3 dB bandwidth approximately 1 MHz. The frequency response of the overall system is a product of both the rotor frequency response and the stator frequency response, but due to the higher degree of selectively of the stator, in some instances, tuning the stator may have more effect on the overall system frequency response.

In some implementations, tuning may occur at only the RTE or only the STE. In other implementations, tuning may occur at both the RTE and the STE. In implementations where tuning occurs at the both the RTE and the STE, the tuning may occur concurrently, or the system may first attempt to tune the STE and only tune the RTE if tuning the STE proves to be insufficient, or vice versa.

Figure 2B:
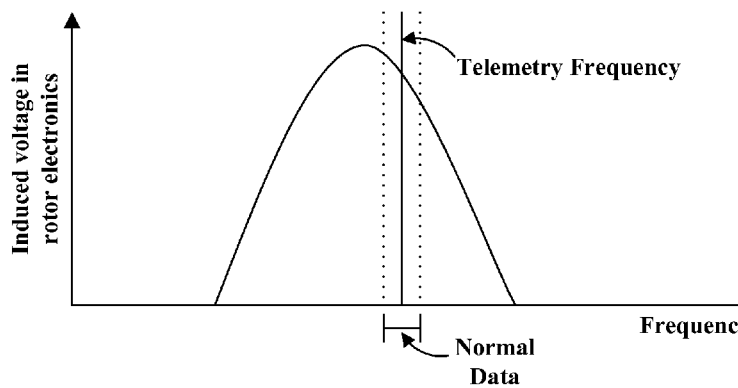
Figure 2C:
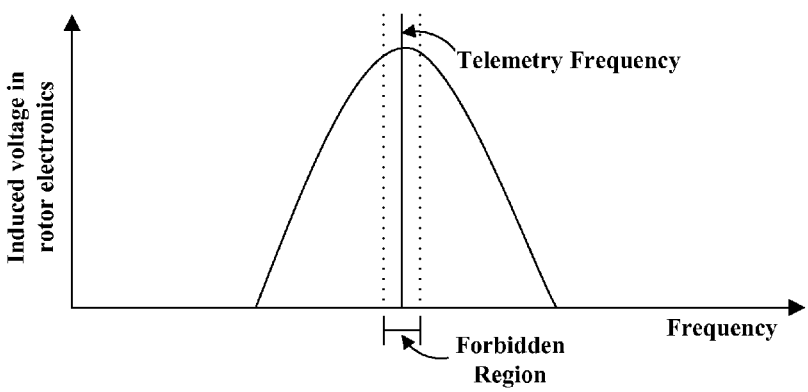
Figure 2D:
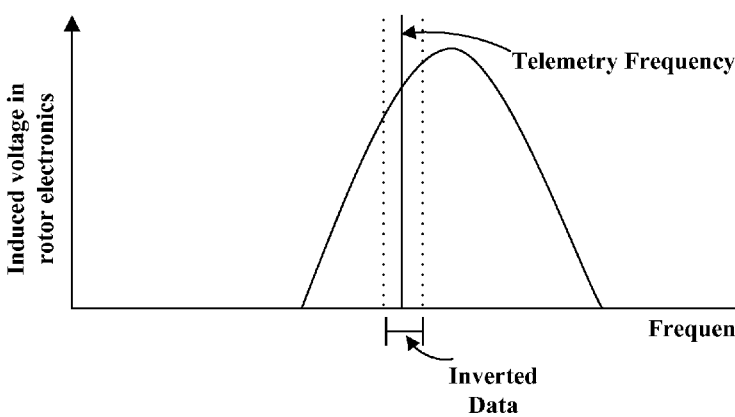

FIGS. 2B-2D are graphs of system frequency response that show the induced voltage in the RTE as a function of frequency response. The telemetry frequency is the frequency of the carrier that powers the RTE. The telemetry frequency is usually determined by a stable frequency source such as a crystal oscillator in the stator electronics and does not typically change with either the stator or rotor electronics tuning.

FIGS. 2B-2D show a system response with three unique bands. FIG. 2B shows the normal data band. Generally, it is desirable to tune the system such that the telemetry frequency is in the normal data band. If the RF power input is adequate, the recovered voltage should also be adequate and the amplitude modulated digital signal should have sufficient modulation depth. FIG. 2C shows a forbidden band. In this forbidden band shown in FIG. 2C, the voltage induced in the RTE is maximum but an amplitude modulated digital signal does not have sufficient modulation depth for data transfer. FIG. 2D shows the data inversion band. This band generally operates the same as the normal data band, but digital data is inverted. For example, a digital signal of 11010 in the normal band appears as 00101 in the data inversion band. A stator can be configured to detect inverted data, thus making the data inversion band also suitable for data communication. Tuning of the system, as described in this disclosure, generally includes adjusting parameters of the LC tuned circuits in a rotor and/or a stator such that the telemetry frequency is generally in the normal data band or data inversion band but not within the forbidden band.

One objective of stator tuning may be to adjust the gap between the resonant frequency of the stator LC and the telemetry frequency in order to create sufficient power transfer from stator to rotor and reliable data transfer from rotor to stator. Similarly, one objective of rotor tuning is to adjust the gap between resonant frequency of the rotor LC and telemetry frequency to ensure sufficient power transfer from stator to rotor and reliable data transfer from rotor to stator.

Figure 3:
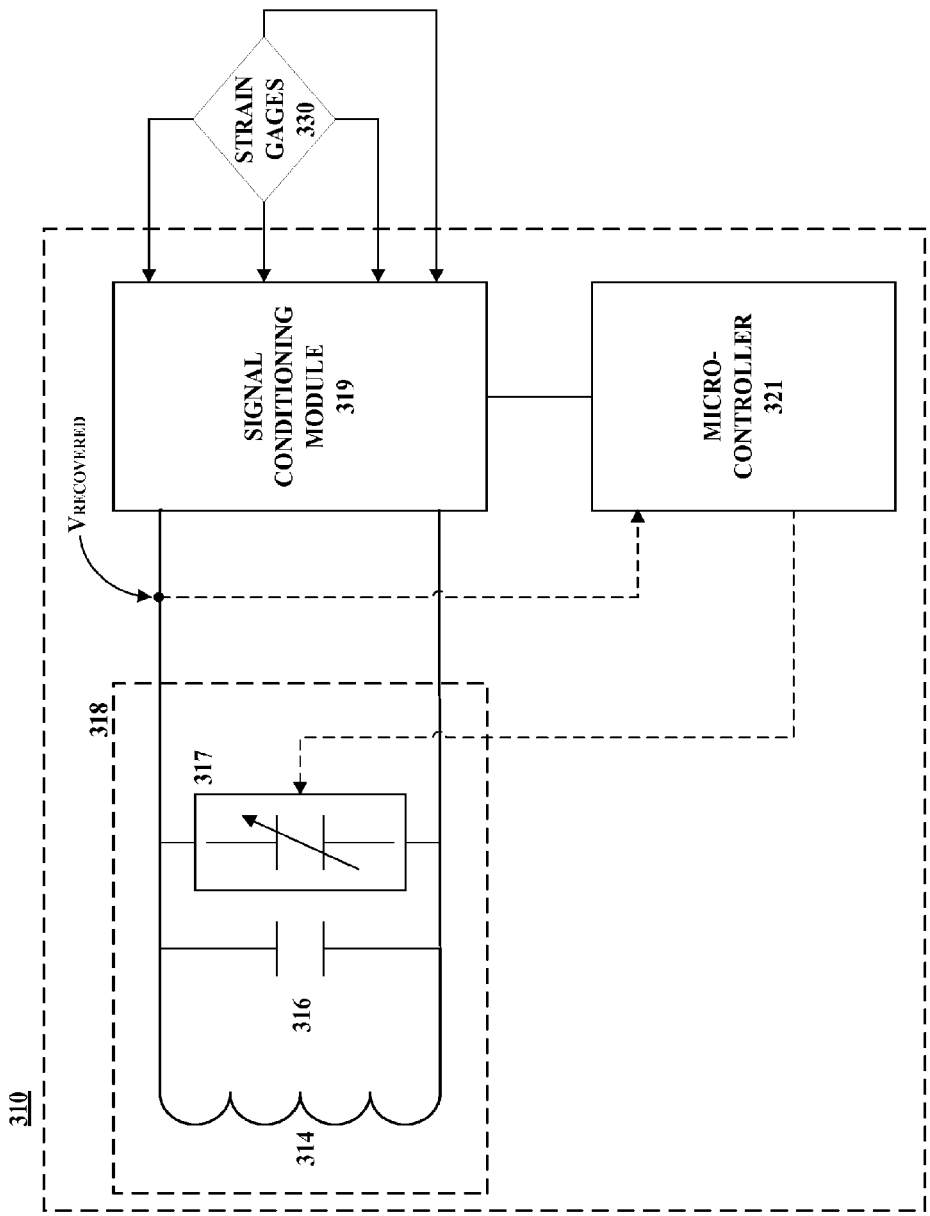
FIG. 3 is a circuit diagram showing components of rotor electronics implementing aspects of the present disclosure.

FIG. 3 is a circuit diagram showing components of rotor electronics (RTE) 310 of a rotor device, such as rotor 110 of FIG. 1, that are configured to receive torque measurements signals from strain gages 330. RTE 310 includes antenna 314, fixed capacitor 316, variable capacitive element 317, signal conditioning module (SCM) 319, and micro-controller 321. RTE 310 can both transmit a signal to a stator device and receive a signal from a stator device. When receiving a transmission, RTE 310 receives an RF signal from a stator device at antenna 314. The components shown in box 318 comprise a parallel LC circuit. Fixed capacitor 316 has a capacitance value selected during assembly of RTE 310 to coarsely tune antenna 314 to the telemetry frequency in the manner described above with relation to FIGS. 2B-D. As will be described in more detail below, micro-controller 321 can change the capacitive value of variable capacitive element 317 such that that the total capacitance of fixed capacitor 316 and variable capacitive element 317 can be set to multiple different values. Micro-controller 321 can either identify the value for variable capacitive element 317 that produces the best tuning, or can transmit recorded data to a stator device so the stator device can identify the value for variable capacitive element 317 that produces the best tuning Identifying a desired tuning for the LC circuit of box 318 can be performed by causing micro-controller 321 to record recovered voltage values ($V_{RECOVERED}$) for various values of variable capacitive element 317. Based on the recorded values for $V_{RECOVERED}$, micro-controller 321 might set variable capacitive element 317 to a desired value. Alternatively, micro-controller 321 may transmit the values of $V_{RECOVERED}$ to a stator device so the stator device can determine a desired value for variable capacitive element 317. A stator device, such as stator 120 which includes computer 124 for example, may have greater computational resources than RTE 310, and thus can use more sophisticated techniques for determining a desired tuning than would be practical to implement in RTE 310.

Determination of a desired value for variable capacitive element 317 may include testing a group of values and identifying a preferred value from the group. Determination of a desired value may also include testing values for capacitive element 317 until an adequate value is found instead of testing an entire group of values. Additionally, as will be explained in more detail below, the stator device may use the recorded values of $V_{RECOVERED}$ for performing stator tuning. In some implementations the tuning of RTE 310 may be based only on recorded values for $V_{RECOVERED}$, but in other implementations $V_{RECOVERED}$ may be one of multiple variables that are monitored for the purposes of determining a desired tuning.

As will be described in more detail below, RTE 310 may be configured to operate in a tuning mode, where micro-controller can cause RTE 310 to transmit a signature byte that contains a series of bits known to a stator. Upon receiving a confirmation of tuning from the stator device, RTE 310 can enter into a normal operating mode. If, however, RTE 310 does not receive a confirmation of tuning within a certain period of time, then micro-controller 321 can adjust the capacitance of variable capacitive element 317.

In implementation, the functionality of SCM 319 may perform amplification, filtering, signal rectification, analog-to-digital conversion, low drop out regulation, amplitude shift keying, and numerous other signal processing operations necessary or desirable for purposes of measuring torque values and communicating with a stator device. In some implementations, these various functions may be performed by a plurality of units at various locations throughout RTE 310. It should also be noted that the location of variable capacitive element 317 shown in FIG. 3 is merely one example configuration. In some configurations, for example, circuitry corresponding to the various functionality of SCM 319, such as signal rectification, may occur between fixed capacitor 316 and variable capacitive element 317. The circuit diagram of FIG. 3 is merely intended to be one non-limiting example of the electronics that might be found in a rotor device.

Figure 4:
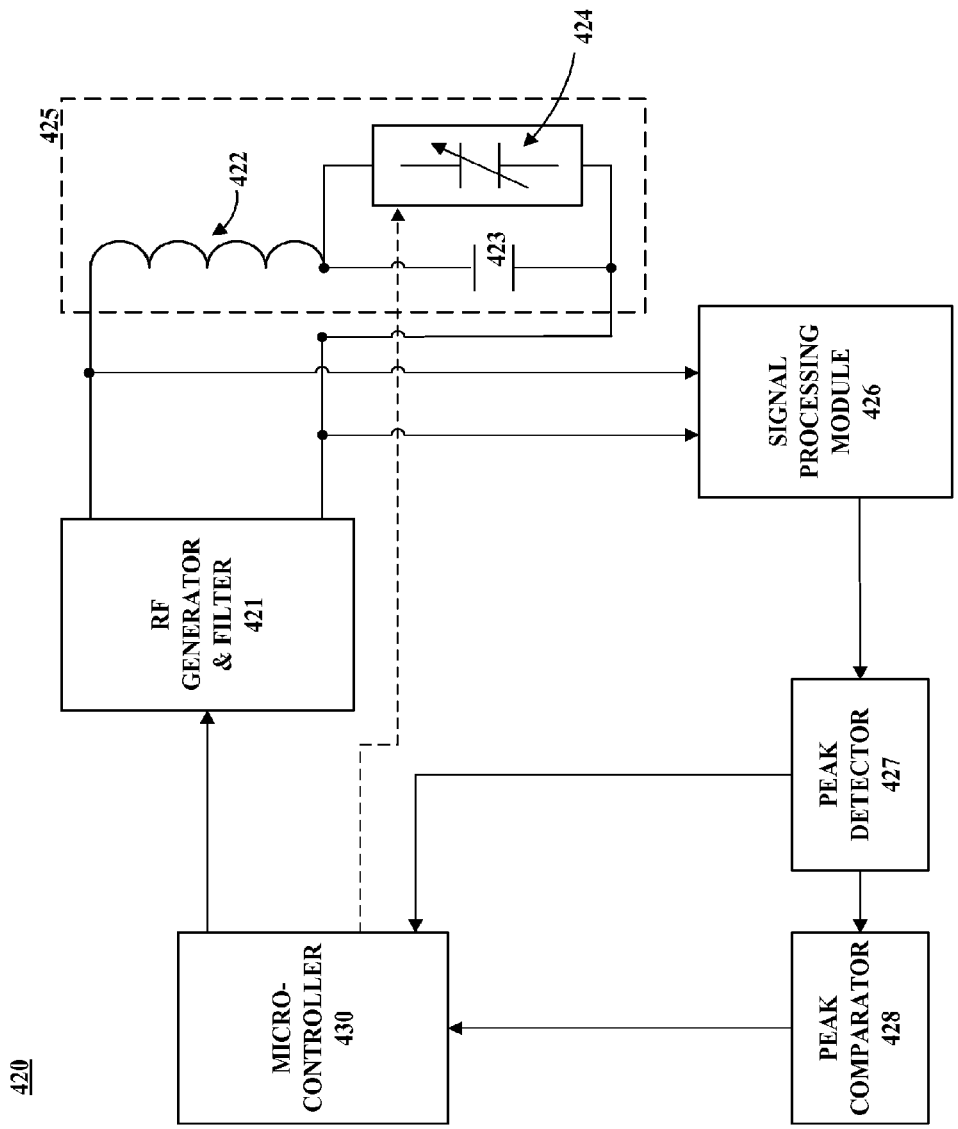
FIG. 4 is a circuit diagram showing components of stator electronics implementing aspects of the present disclosure.

FIG. 4 is a circuit diagram showing components of stator electronics (STE) 420 of a stator device, such as stator 120 of FIG. 1. STE 420 includes an RF generator and filter 421, stator antenna 422, fixed capacitor 423, and variable capacitive element 424. The components shown in box 425 collectively form a series LC circuit. STE 420 further includes signal processing module (SPM) 426, peak detector 427, peak comparator 428, data inversion detection module 429, and micro-controller 430. Although not shown in FIG. 4, STE 420 may also include circuitry for detecting data inversion as described in FIG. 2D and may include amplitude modulation circuitry for modulating a signal with data for purposes of communicating with a rotor device. STE 420 is configured to both transmit and receive a signal via stator antenna 422.

To transmit a signal, micro-controller 430 may cause RF generator and filter 421 to generate an amplitude modulated signal for transmission to a rotor device. When receiving a signal SPM 426 can demodulate, filter, differentiate, and amplify the received signal. STE 420 may perform a wide array of signal processing functions on both transmitted and received signals. For ease of explanation, this disclosure generally ascribes these various functions to SPM 426, but in some implementations, these various functions may be performed by a plurality of units at various locations throughout STE 420. The circuit diagram of FIG. 4 is merely intended to be one non-limiting example of the electronics that may be found in a stator device.

During tuning, SPM 426 can be configured to identify a signal from a rotor device by identifying a signature byte transmitted by the rotor device. After SPM 426 identifies a signal from a rotor, peak detector 427 can detect the peak output of SPM 426, which is one measure of the quality of the received signal. Based on the peak value detected by peak detector 427, micro-controller 430 may either adjust the capacitance of variable capacitive element 424 or determine that the system is adequately tuned and enter into a normal mode of operation. In some implementations, peak comparator 428 may compare detected peaks for a set of capacitance values for variable capacitive element 424, and micro-controller can set variable capacitive element 424 to the capacitance that results in the best signal quality, which in this example might be the capacitance that results in the largest detected peak value by peak detector 427.

In some implementations, either instead of or in addition to detecting a peak of a signal received at STE 420, micro-controller 430 may also receive, from a rotor device, data identifying a recovered voltage at the rotor device. Based on the recovered voltages at the rotor device, micro-controller 430 may either adjust the capacitance of variable capacitive element 424 or determine that the system is adequately tuned and enter into a normal mode of operation. In some implementations, STE 420 may compare recovered voltages for a set of capacitance values for variable capacitive element 424, and micro-controller can set variable capacitive element 424 to the capacitance that results in the best recovered voltage at the rotor device.

Figure 5:
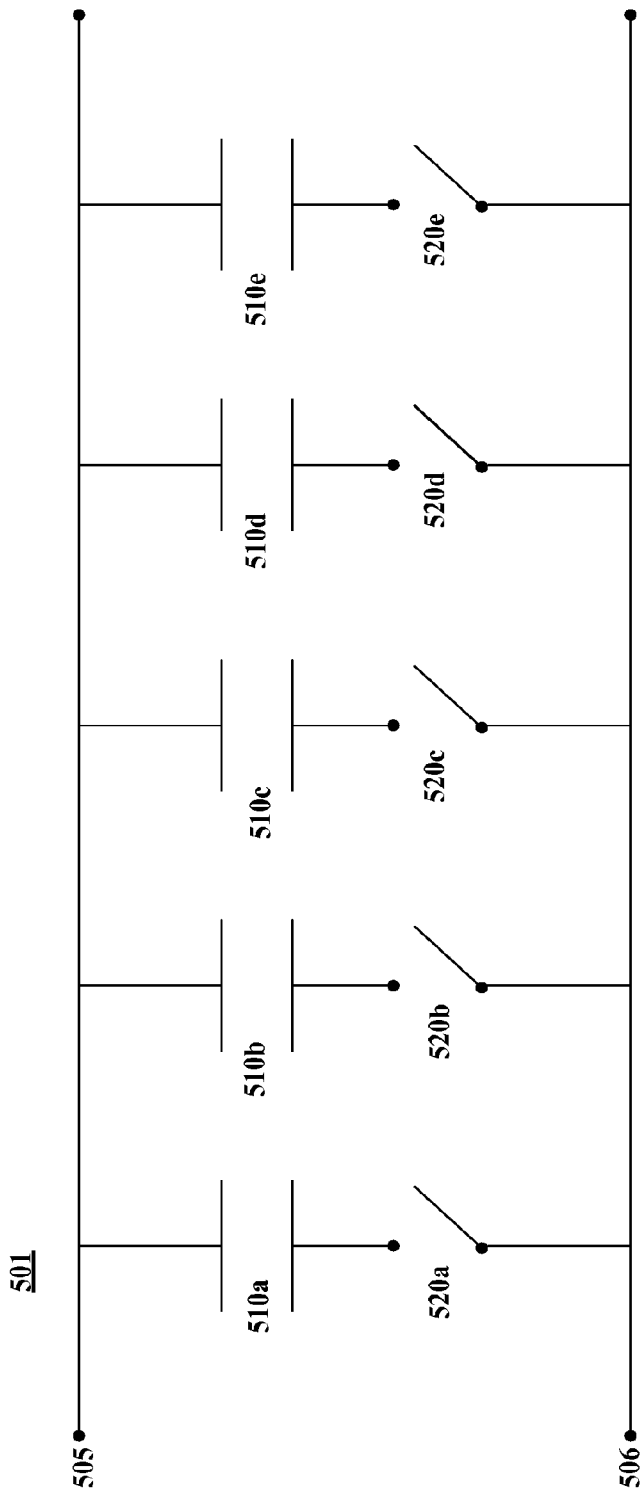
FIG. 5 is a circuit diagram of a variable capacitive component implementing aspects of the present disclosure.

FIG. 5 shows an example of a variable capacitive component 501, which could be used in either a RTE or STE according to the techniques of this disclosure. Variable capacitive component 501 is configured to be able to produce variable capacitances between lead 505 and lead 506. Variable capacitive component 501 may, for example, be included in the variable capacitive element 317 of FIG. 3 or variable capacitive element 424 of FIG. 4. Variable capacitive component 501 includes 5 capacitors (capacitors 510*a*-510*e*) connected to one another in parallel. In other configurations, different numbers of capacitors as well as capacitors connected in series may be utilized. Each of capacitors 510*a*-510*e* is connected to lead 506 through a switch (switches 520*a*-520*c*). When switch 520*a* is closed, capacitor 510*a* contributes to the capacitance between leads 505 and 506. When switch 520*a* is open, capacitor 510*a* does not contribute to the capacitance between leads 505 and 506. Capacitors 510*b*-510*e* and switches 520*b*-520*e* contribute in a similar manner.

Switches 520*a*-520*e* are configured to be controllable by a micro-controller, such as micro-controller 321 of FIG. 3 or micro-controller 430 of FIG. 4. Switches 520*a-e* may comprise digitally controlled switches that enable bi-directional current flow such as transistor-based switches (e.g. MOSFETs), or may be alternate types of switches such as electromechanical relays or PIN diode switches.

In one example, variable tuning of approximately +/−45 pF can be achieved by a configuration that uses 10 pF capacitors for capacitors 510*a* and 510*b*, a 15 pF capacitor for capacitor 510*c*, a 30 pF capacitor for capacitor 510*d*, and a 47 pF capacitor for capacitor 510*e*. Capacitors in parallel are added to determine a total capacitance. For example, using the example capacitance values given above, if all of switches 520*a*-520*e* are open, then the total capacitance of variable capacitive element 501 is 0 pF. If only switch, 520*a* is closed, then the total capacitance of variable capacitive element 501 is 10 pF. If only switch 520*e* is closed then the total capacitance of variable capacitive element 501 is 47 pF. If all of switches 520*a*-520*e* are closed, then the total capacitance of variable capacitive element 501 is the sum of the capacitances of capacitors 510*a*-510*e* (112 pF in this instance). By closing different combinations of switches 520*a*-520*e*, the value of capacitive component 501 can be set to various values between 0 pF and 112 pF. Adding this additional capacitance to a fixed capacitor in either an RTE or STE can change the total capacitance of the system, and hence adjust the tuning of the RTE or STE.

As described above in reference to FIG. 2A, STEs typically have a higher degree of selectivity compared to RTEs. Accordingly, in an STE, it may be desirable to utilize a variable capacitive element that increments in smaller values than a variable capacitive element used in an RTE. In some implementations, a variable capacitive element like that of FIG. 5 may use capacitors with greater capacitance, such as 20-30 pF, if variable capacitive component 501 is going to be implemented in a rotor device, and use capacitors with less capacitance, such as 5-10 pF, if variable capacitive component 501 is going to be implemented in a stator device.

Figure 6A:
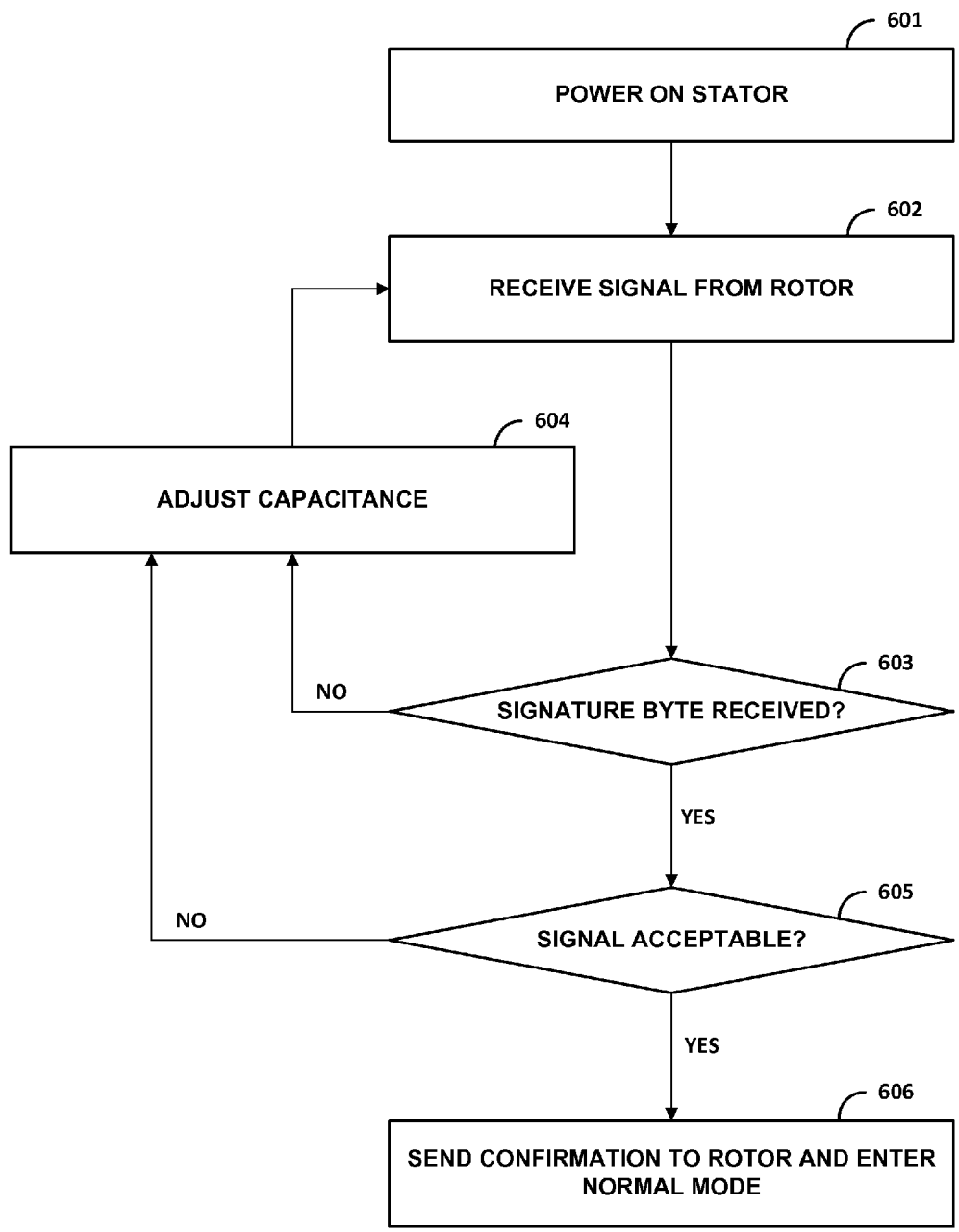
FIG. 6A is a flow diagram illustrating a stator tuning technique consistent with the present disclosure.
Figure 6B:
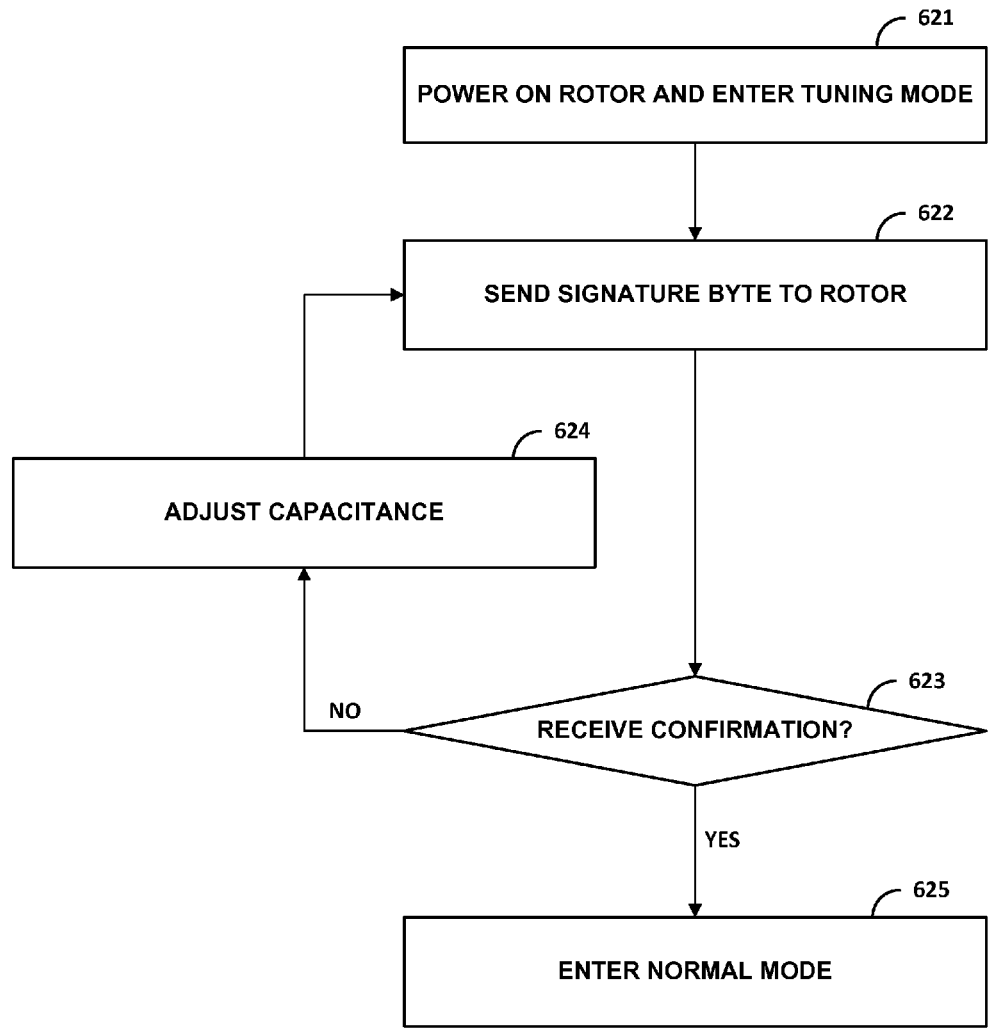
FIG. 6B is a flow diagram illustrating a rotor tuning technique consistent with the present disclosure.

FIG. 6A is a flow diagram illustrating a stator tuning technique consistent with the present disclosure. FIG. 6B is a flow diagram illustrating a rotor tuning technique consistent with the present disclosure. As will be described in more detail below, the methods or portions of the methods described in relation to FIGS. 6A and 6B can be performed either independently or concurrently. The methods of FIGS. 6A and 6B will be described with reference to FIGS. 1, 3, 4, and 5. To begin stator tuning as shown in FIG. 6A, a user of a torque measurement, such as torque measurement system 100 of FIG. 1 powers on a stator device, such as stator device 120 with STE 420 (601). STE 420, either automatically or upon user command, enters into a tuning mode. STE 420, which inductively powers a rotor device, such as rotor device 110 with RTE 310, causes the rotor device to be powered on as part of entering the tuning mode.

When initially powered on, micro-controller 321 of RTE 310 begins periodically transmitting via the LC circuit of box 318 a signature byte to STE 420. The signature byte can be a series of bits identifiable by STE 420. The stator device receives a signal from rotor device 310 at the LC circuitry of box 425 (602) and attempts to identify this signature byte within the received signal received (603). Signal processing module 426 can process the received signal to determine if the signature byte can be identified (603). If the signature byte cannot be identified within the received signal (603, no), then micro-controller 430 can adjust the capacitance of variable capacitive element 424 (604). After changing the capacitance of variable capacitive element 424, STE 420 can continue to receive a signal from the rotor (602) and to identify the signature byte within the received signal (603). This process can repeat until STE 420 can identify the signature byte within a received signal (603, yes).

Upon identifying the signature byte, peak detector 427 can further determine a signal quality for the received signal and determine if the signal quality is acceptable (605). As discussed above, the determination of signal quality may be based on one or more characteristics of the signal received by STE 420, or may be based on characteristics of the signal received at RTE 310 that are measured by RTE 310 and transmitted back to STE 420. In one example, RTE 310 may measure a recovered voltage and transmit back to STE 420 an indication of the recovered voltage so that STE 420 can determine if the signal quality is at or above an acceptable level. If the signal quality is of an acceptable level (605, yes), then STE 420 can send a confirmation of tuning to the rotor device and enter a normal mode of operation (606). A signal may be deemed acceptable if, for example, peak detector 427 detects a peak for the recovered voltage that is greater than a threshold value. In other implementations, peak comparator 428 may determine which recovered voltage of a set of recovered voltages results in the largest peak value, in which case a recovered voltage might be deemed acceptable, for example, if it has the largest peak of the set. Micro-controller 430 can set variable capacitive element 424 to the capacitance value that resulted in the acceptable signal quality. The confirmation of tuning sent by STE 420 can indicate to the rotor that a desired tuning has been achieved and that the rotor may enter a normal mode of operation.

If the signal quality of the signal containing the signature byte is determined not to be acceptable (605, no), then micro-controller 430 can adjust the capacitance of variable capacitive element 424, and STE 420 can repeat the process of receiving a signal from the rotor (602), attempting to a identify a signature byte (603), adjusting capacitance if a signature byte cannot be identified (604), and determining if a signal quality is acceptable (605) until an acceptable signal quality is found (605, yes), and then STE 420 can send a confirmation of tuning and enter a normal mode of operation (606).

As mentioned, FIG. 6B is a flow diagram illustrating a rotor tuning technique consistent with the present disclosure. A rotor device, such as rotor device 110 or 310, can be powered on and enter a tuning mode (621). As discussed above, powering on of RTE 310 may be achieved, for example, by a user powering on a stator device, and the stator device inductively powering RTE 310. Upon being powered on, rotor device 310 can enter a tuning mode in which micro-controller 321 causes a signature byte or a series of signature bytes to be transmitted via the LC circuit of box 318 (622). After sending the signature bytes, RTE 310 can wait a period of time to see if a confirmation of tuning is received from a stator (623). If RTE 310 receives a confirmation of tuning (623, yes), then RTE 310 can enter a normal mode of operation (625). If RTE 310 does not receive a confirmation of tuning within a specified period of time (623, no), then micro-controller 321 can adjust the capacitance of variable capacitive element 317 (624), and RTE 310 can transmit additional signature bytes (622). The process of adjusting variable capacitive element (317), sending signature bytes (622), and waiting for a confirmation of tuning (623) can be repeated multiple times can be repeated until a confirmation of tuning is received, and RTE 310 enters a normal mode of operation (625).

The period of time RTE 310 waits to receive a confirmation of tuning may, for example, be enough time for a stator device to execute several iterations of the method described with regards to FIG. 6A. Thus, a torque measurement system may attempt to tune the system first by stator tuning, and only if stator tuning is initially not successful does the system begin rotor tuning. Although not explicitly show in FIGS. 6A and 6B, a torque measurement system, such as system 100, may be configured to enter an error mode if neither stator tuning or rotor tuning result in a desired overall system tuning.

Various examples have been described herein. These and other examples are within the scope of the following claims.

The invention claimed is:

1. A torque measurement system comprising:
    a stator device configured to receive a signal from a rotor device, the stator device comprising:
        a first variable capacitive element;
        a first micro-controller configured to adjust a first capacitance value of the first variable capacitive element; and,
        a peak detector for detecting a peak value of the signal received from the rotor device, and wherein the first micro-controller adjusts the first capacitance value based at least in part on the detected peak value.

2. The torque measurement system of claim 1, further comprising:
    the rotor device, wherein the rotor device is configured to transmit a signal to the stator device, the rotor device comprising:
        a second variable capacitive element;
        a second micro-controller configured to adjust a second capacitance value of the second variable capacitive element.

3. The torque measurement system of claim 2, wherein the second micro-controller is configured to adjust the second capacitance value in response to not receiving a confirmation of tuning message from the stator device within a period of time.

4. The torque measurement system of claim 2, wherein the second micro-controller is configured to enter a normal operating mode in response to receiving a confirmation of tuning message from the stator device.

5. The torque measurement system of claim 2, wherein the stator device determines a value for the second capacitance value, and the second micro-controller adjusts the second capacitance based at least in part on the determined value.

6. The torque measurement system of claim 1, wherein the first variable capacitive element comprises a first switch connected to a first capacitor, and wherein the first micro-controller adjusts the first capacitance value by opening and closing the first switch.

7. The torque measurement system of claim 6, wherein the first switch comprises a transistor-based switch.

8. The torque measurement system of claim 6, wherein the first switch comprises an electro-magnetic relay.

9. The torque measurement system of claim 1, further comprising:
    a peak comparator for comparing a plurality of the detected peak values of the signal received from the rotor device to identify a preferred peak value, wherein the first micro-controller adjusts the first variable capacitance value based on the preferred peak value.

10. The torque measurement system of claim 1, wherein the signal from the rotor device includes data identifying a recovered voltage at the rotor device, wherein the first micro-controller adjusts the first capacitance value based at least in part on the recovered voltage.

11. The torque measurement system of claim 1, wherein the stator device further comprises:
    a signal processing module configured to identify a signature byte in the signal from the rotor device, and wherein the first micro-controller is configured to adjust the first capacitance value in response to not identifying the signature byte in the signal from the rotor device.

12. The torque measurement system of claim 11, wherein the stator device is configured to transmit a confirmation of tuning to the rotor device in response to identifying the signature byte in the signal and the signal being of an acceptable quality.

13. The torque measurement system of claim 11, wherein the first micro-controller is configured to adjust the first capacitance value in response to the stator identifying the signature byte and the signal not being of an acceptable quality.

14. A torque measurement system comprising:
 a rotor device configured to transmit a signal to a stator device, the rotor device comprising:
  a variable capacitive element;
  a micro-controller configured to adjust a capacitance value of the variable capacitive element; and,
  a peak detector for detecting a peak value of the signal received from the rotor device, and wherein the first micro-controller adjusts the first capacitance value based at least in part on the detected peak value.

15. The torque measurement system of claim 14, wherein the variable capacitive element comprises a switch connected to a capacitor, and wherein the micro-controller is configured to adjust the capacitance value by opening and closing the first switch.

16. The torque measurement system of claim 15, wherein the switch comprises a transistor-based switch.

17. The torque measurement system of claim 15, wherein the switch comprises an electro-magnetic relay.

18. The torque measurement system of claim 14, wherein the micro-controller is configured to adjust the capacitance value in response to not receiving a confirmation of tuning message from the stator device within a period of time.

19. The torque measurement system of claim 14, wherein the micro-controller is configured to enter a normal operating mode in response to receiving a confirmation of tuning message from the stator device.

20. The torque measurement system of claim 14, further comprising:
 a peak comparator for comparing a plurality of the detected peak values of the signal received from the rotor device to identify a preferred peak value, wherein the first micro-controller adjusts the first variable capacitance value based on the preferred peak value.

* * * * *